(12) United States Patent
Laganakos et al.

(10) Patent No.: US 11,902,497 B2
(45) Date of Patent: Feb. 13, 2024

(54) DEPTH MEASUREMENT

(71) Applicant: Arm Limited, Cambridge (GB)

(72) Inventors: Vasileios Laganakos, Cambridge (GB); Irenéus Johannes De Jong, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/700,457

(22) Filed: Dec. 2, 2019

(65) Prior Publication Data

US 2021/0168348 A1    Jun. 3, 2021

(30) Foreign Application Priority Data

Nov. 28, 2019  (EP) .................................... 19386047

(51) Int. Cl.
*H04N 13/271* (2018.01)
*H04N 23/67* (2023.01)
*H04N 13/00* (2018.01)

(52) U.S. Cl.
CPC ......... *H04N 13/271* (2018.05); *H04N 23/675* (2023.01); *H04N 2013/0081* (2013.01)

(58) Field of Classification Search
CPC .............. H04N 5/23212; H04N 13/271; H04N 2013/0081; H04N 5/2258; H04N 13/128; H04N 5/232123; H04N 5/23232; H04N 13/239; G06T 2207/10028; G06T 5/50; G06T 7/593
See application file for complete search history.

(56) References Cited

U.S. PATENT DOCUMENTS

2012/0307108 A1* 12/2012 Forutanpour ........... G06T 7/571
                                              348/231.3
2014/0118570 A1*  5/2014 Chehade .................. G06T 7/571
                                              348/222.1
2014/0267243 A1*  9/2014 Venkataraman ..... H04N 13/106
                                              345/419

* cited by examiner

*Primary Examiner* — Farhan Mahmud
(74) *Attorney, Agent, or Firm* — EIP US LLP

(57) ABSTRACT

A method comprising the steps of obtaining image data captured at an image sensor using a focus configuration. A distance is determined for one or more objects in the image data, based on the focus configuration and a sharpness characteristic of the image data of the object. A depth map is then generated based on the determined distance.

8 Claims, 4 Drawing Sheets

DEPTH MEASUREMENT

CROSS-REFERENCE TO RELATED APPLICATIONS

This application claims priority to EP Application No. EP 19386047.5, filed Nov. 28, 2019, under 35 U.S.C. § 119(a). The above-referenced patent application is incorporated by reference in its entirety.

BACKGROUND OF THE INVENTION

Field of the Invention

The present invention relates to methods, processors and systems for generating depth information. The disclosure has particular, but not exclusive relevance to obtaining depth measurements in relation to items within a real-world environment.

Description of the Related Technology

Sensor systems are capable of capturing images and other data in relation to a real-world environment in great detail and with great accuracy. With the increase in processing power available in modern computing devices, the amount of information a computer device is capable of analyzing is also increasing. As such it is possible to process sensor data to obtain more detailed, and in some examples, more useful data for display and/or use by a user or by the computing device.

Such information includes data regarding the distance of objects from the sensor system, which may be employed not only in robotics or navigation-related applications but may also be employed in image processing applications. Therefore, it is desirable to improve the efficiency and reduce the cost of obtaining and gathering such information.

SUMMARY

According to a first aspect of the present invention, there is provided a method comprising the steps of obtaining image data captured at an image sensor using a focus configuration; determining a distance of one or more objects in the image data, based on the focus configuration and a sharpness characteristic of the image data of the object; and generating a depth map based on the determined distance.

According to a second aspect of the present invention, there is provided a processor comprising an input module for obtaining image data, the image data captured at an image sensor comprising a focus configuration; a determination module for determining a distance of at least one object in the image data, based on the focal length and a sharpness characteristic of the object in the image data; and a generation module for generating a depth map based on the determined distance.

According to a third aspect of the present invention, there is provided a system comprising at least one image sensor for obtaining image data; a focus configuration for directing light to the image sensor; and a processor according to the second aspect arranged to receive the image data obtained by the image sensor.

According to a fourth aspect of the present invention, there is provided non-transitory computer-readable storage medium comprising computer-executable instructions stored thereon which, when executed by at least one processor, cause the at least one processor to obtain image data captured at an image sensor using a focus configuration; determine a distance of one or more objects in the image data, based on the focus configuration and a sharpness characteristic of the image data of the object; and generate a depth map based on the determined distance.

BRIEF DESCRIPTION OF THE DRAWINGS

Further features and advantages of the invention will become apparent from the following description of preferred embodiments of the invention, given by way of example only, which is made with reference to the accompanying drawings in which like reference numerals are used to denote like features.

DETAILED DESCRIPTION OF CERTAIN INVENTIVE EMBODIMENTS

Details of methods and processors according to examples will become apparent from the following description with reference to the Figures. In this description, for the purposes of explanation, numerous specific details of certain examples are set forth. Reference in the specification to 'an example' or similar language means that a feature, structure, or characteristic described in connection with the example is included in at least that one example, but not necessarily in other examples. It should be further noted that certain examples are described schematically with certain features omitted and/or necessarily simplified for the ease of explanation and understanding of the concepts of the examples.

Capturing data relating to a real-world environment has a number of uses, in particular in relation to autonomous vehicles, augmented reality, virtual reality, computer vision and simultaneous localization and mapping (SLAM). Obtaining information relating to the real-world environment is often undertaken by different sensor systems, including but not limited to sensors capable of capturing image data, such as a camera, and sensors capable of capturing time-of-flight information, such as sonar or LiDAR which provide depth information, although it will be appreciated that there are other methods for obtaining depth information either by analyzing data captured by the device to generate an estimate or by using specialized hardware.

Information captured from such sensor suites can be processed and combined to create detailed maps of a real-world environment for use by further processors, such as the processors configured to direct an autonomous vehicle. However, the introduction of additional sensor systems and the processing associated with them not only increases the cost of a device but also increases the computational complexity associated with generating the depth information. Therefore, it is an object of the present invention to provide a method, processor and system capable of producing detailed depth maps efficiently, and without the need for a large number of sensors systems, whilst minimising the processing required.

Figure 1:
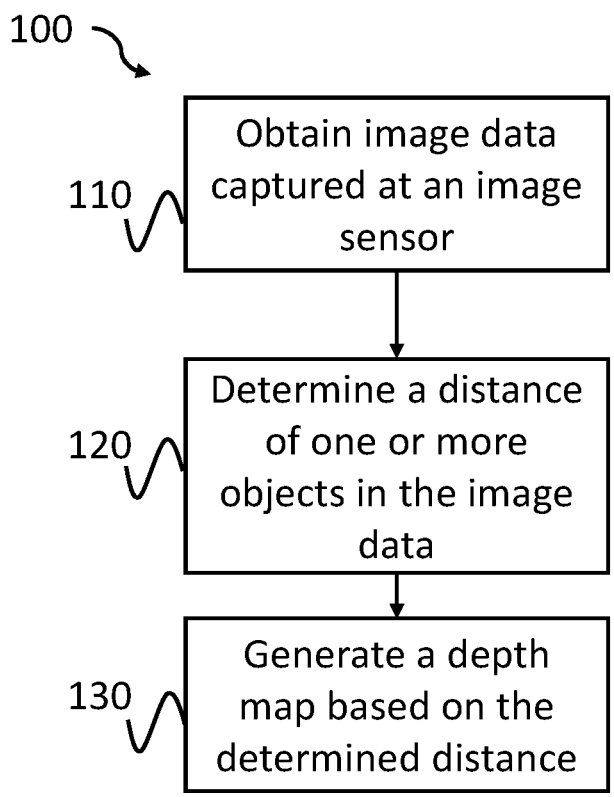
FIG. 1 is a flow diagram illustrating a method according to a first example.

FIG. 1 is a flow diagram illustrating a method 100 according to an example. At item 110, image data is obtained from at least one sensor. The image data is representative of a real-world environment at a given time. The image data may be visual data captured from a sensor, such as a camera. The images may represent an area of the real-world environment in colour or greyscale. In other examples, it will be appreciated that the image data may be associated with another type of sensor and/or captured by a plurality of sensors, each sensor being the same or different. The image data may also undergo pre-processing, such as by an image signal processor (ISP) to generate an accurate representation of the real-world environment at the first time based on the output of the plurality of sensors.

In some examples, the image data may comprise multiple frames of image data, each frame of image data representative of the real-world environment at a different time.

The image data is captured using a focus configuration which is arranged to direct light to the image sensor. The focus configuration may have a number of characteristics, such as a focal length characteristic, an aperture characteristic and a lens property. The focal length characteristic may be fixed or variable, and may in some example comprise an autofocusing mechanism. The aperture characteristic may represent a fixed or variable aperture, and the lens property may include different types of lens, such as a fisheye, wide-angle or standard zoom lens. The lens property may also relate to other features of the lens, such as the distortion of space, an angle of view, and the magnification.

Once the image data has been obtained, the method proceeds to item 120 where a distance of the object from the camera is determined. The focus configuration and the characteristics and properties associated with it can be used to determine whether an object in the image data is in focus. It will be appreciated that this may be undertaken by the image sensor itself in an analysis step (not shown), and in some examples, this may comprise determining whether an object is at the autofocus point of the focus configuration. Determining the distance of an object may comprise an object detection step, which detects objects in a real-world environment represented in the image data, and a determination step for determining whether said objects have been captured in focus or out of focus This will be described in further detail below in relation to FIG. 2. Determining whether the image data represents objects which are in focus or out of focus may be undertaken by applying at least one of a Fast Fourier Transform or a Laplace operator to generate a sharpness characteristic representative of the degree to which an object is in focus in the image data. For example, by applying a Laplacian operator in the form of a convolution kernel to the image data, in particular greyscale image data, the sharper edges, representing portions of the image data that are in focus, will return a higher value than the portions of the image data which are not in focus (represented by blurry edges). This can be used to determine the point of focus of the image data by selecting the point with the highest returned value. Similarly, a Fast Fourier Transform will return a number of frequencies, the highest of which is an indication of a point of focus in the image data. It will be appreciated that other methods of detecting whether an object represented in the image data has been captured in focus or not may be used, such as where the maximum contrast in the image data is measured.

The sharpness characteristic may be a numerical value where 'one' represents an in-focus representation of the real-world object and 'zero' represents an out of focus representation of the real-world object. As such, the degree of which an object is in focus or not may be represented as a value between 'one' and 'zero' based on, for example, how blurry the object is in the image data. A threshold value may be set by a user of a system arranged to execute the method indicating the desired level of sharpness required. The threshold value set by the user will indicate the level of error acceptable for determining whether a real-world object is in focus in the image data. As such, the threshold value also determines the accuracy of the depth map generated at item 140. For example, where the threshold is set to 0.75, the method will determine that any objects represented with a sharpness characteristic of 0.75 or higher will be in focus, and an estimate of the distance to the object, with the sharpness characteristic, from the sensor will be determined based on the focus configuration. Where the threshold is set to 0.95, the method will determine that any objects represented with a sharpness characteristic of 0.95 or higher will be in focus, and as such the number of objects determined to be in focus will be lower, thereby increasing the accuracy of the depth map generated. It will be appreciated that the predetermined threshold may be set to any level depending on the requirements of a user, and may be represented as values other than those between 'zero' and 'one'.

Once the distance has been determined, the method progresses to item 130 where a depth map is generated based on this distance.

It will be appreciated that a number of images may be taken by the camera or another sensor with a plurality of focal lengths. This may be achieved using a camera or other sensor which has an autofocusing mechanism, or other mechanisms capable of adjusting or otherwise altering the focal length of the camera by moving the position of the lens. In other examples, image data representing the same real-world environment may be captured by a plurality of cameras each having a fixed focal length, where the focal lengths for each camera are different. In further examples, representations of the real-world environment may be captured by a combination of the two types of sensor. The depth maps associated with each of these sensors may then be combined to produce a higher quality overall depth map.

In some examples, the sharpness characteristic and other information, such as the focal length of the sensor, and the distance determined may be passed to a depth estimator for generating an absolute distance which in turn forms part of an absolute depth map representing the distances of a plurality of objects in the real-world environment.

Figure 2:
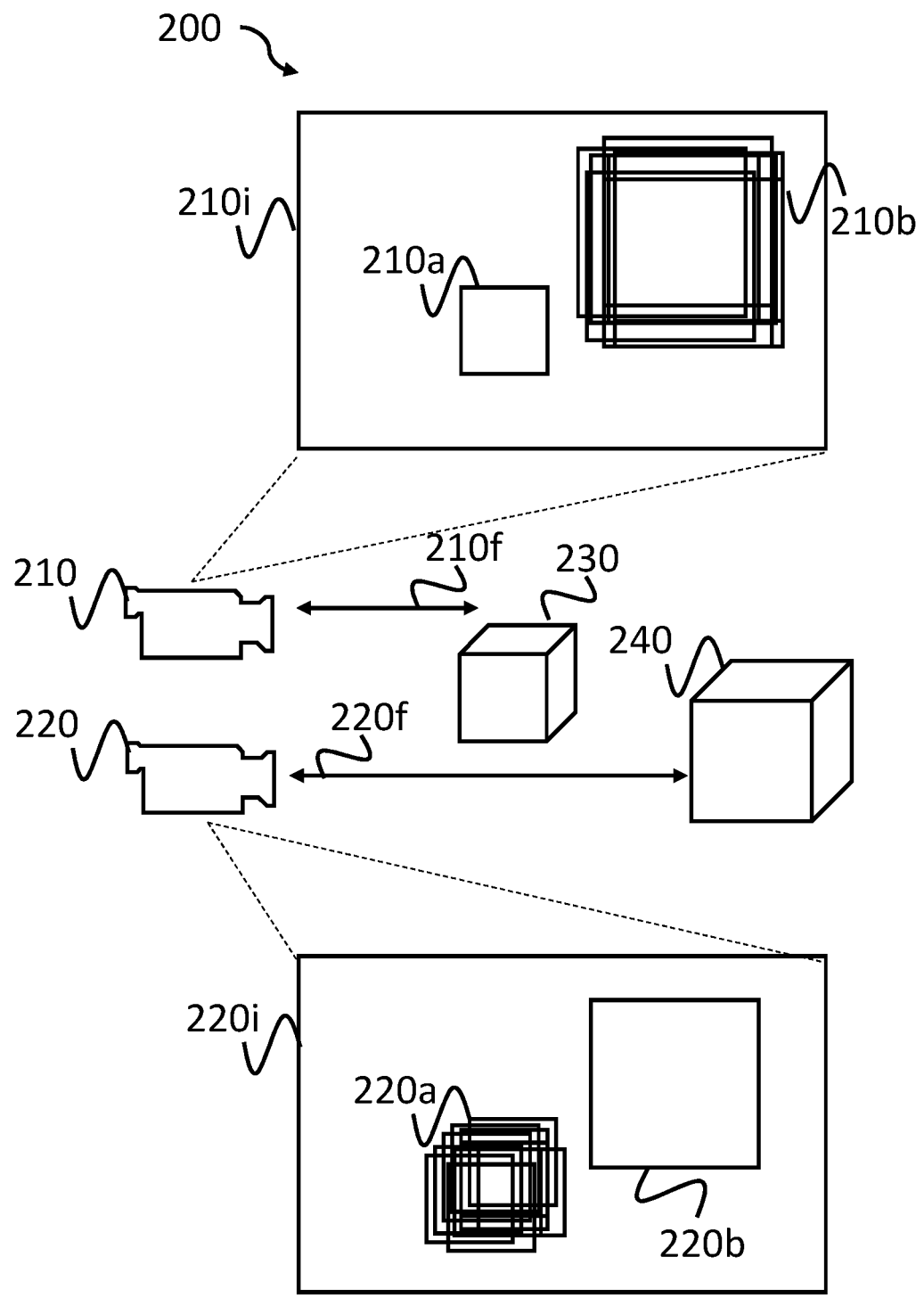
FIG. 2 shows schematically the determination of the distance of real-world objects from an image sensor according to an example.

FIG. 2 shows schematically the determination of the distance of real-world objects from an image sensor, such as a camera, according to an example. The representation 200 comprises two sets of image data 210$i$, 220$i$ captured by two image sensors 210, 220. A first image sensor 210 has a first focal focus configuration, which has a first focal length 210$f$, and a second image sensor 220 has a second focus configuration which has a second focal length 220$f$, both the first and second image sensor are arranged to capture a real-world environment comprising two objects 230, 240 positioned at different distances from the image sensors 210, 220. It will be appreciated that the first focus configuration and the second focus configuration may have other characteristics which differ.

The image data 210$i$ captured by the first image sensor 210 represents the real-world environment and shows both the first object 230 and the second object 240. The first image sensor 210 has a focal length 210$f$ which is substantially similar to the distance the first object 230 is from the first image sensor 210. As such, the image data 210$i$ captured by the first image sensor 210 represents both the first object 210a and second object 210b where the first object 210a is in focus, and the second object 210b is out of focus.

Similarly, the image data 220i captured by the second image sensor also represents the real-world environment and shows both the first object 230 and the second object 240. The second image sensor 220 has a focal length 220f which is substantially similar to the distance the second object is from the second image sensor 220. As such, the image data 220i captured by the second image sensor 220 represents both the first object 220a and the second object 220b where the second object 220a is in focus and the first object 220a is out of focus.

It will be appreciated that the first and second image sensor 210, 220 may be the same image sensor with a variable focal length achieved, for example, via the use of an autofocussing mechanism.

When determining whether an object in the real-world environment is represented in the image data 210i, 220i in focus or out of focus, the sharpness characteristic mentioned above in relation to item 120 of method 100 may be used. As mentioned above, where the sharpness characteristic is compared to a low threshold, a larger number of objects may be determined to have been captured in focus, and as such the accuracy of the depth map generated at item 140 will be comparatively low versus when the sharpness characteristic is compared to a high threshold.

For example, where the threshold is relatively low, the image data 210i representing object 240 as shown at 210b may be determined to be sufficiently sharp such that it is deemed to be in focus. Therefore, the depth map generated would indicate that the first and second object 230, 240 would be at substantially the same distance from the camera. This may be ideal in scenarios where the quality of the depth map is not imperative, and only an estimate of the distance from the image sensor 210, 220 is required.

Figure 3:
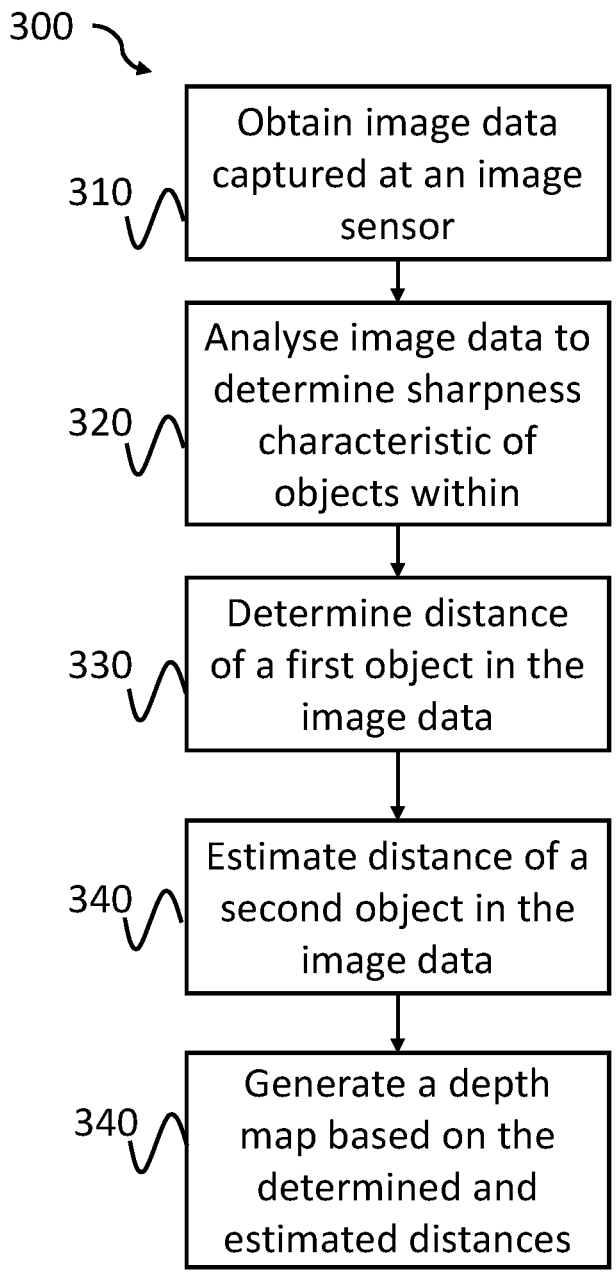
FIG. 3 is a flow diagram illustrating a method according to a second example.

FIG. 3 is a flow diagram illustrating a method 300 according to a second example. At item 310, at least one frame of image data is obtained from at least one sensor using a focus configuration arranged to direct the light to the sensor. The frame of image data being representative of a real-world environment at a given time. The frame of image data may be image data captured from a sensor, such as a camera, including but not limited to data captured in the visual, infrared and/or ultraviolet spectrum. The images may represent an area of the real-world environment in colour or greyscale. In other examples, it will be appreciated that the image data may be associated with another type of sensor and/or captured by a plurality of sensors, each sensor being the same or different. The image data may also undergo pre-processing, such as by an image signal processor (ISP) to generate an accurate representation of the real-world environment at the first time based on the output of the plurality of sensors.

Once the image data has been obtained, the method proceeds to item 320 where the image data is analysed to determine a sharpness characteristic of a plurality of objects in the real-world environment represented by the image data. The analysis of the image data may comprise an object detection step, which detects real-world objects captured by the sensor and represented in the image data, and a determination step for determining whether said objects have been captured in focus or out of focus, as described in further detail above in relation to FIG. 2. Determining whether the image data has captured objects which are in focus or out of focus may be undertaken by applying at least one of a Fast Fourier Transform or a Laplace operator to generate a sharpness characteristic representative of the degree to which an object is in focus in the image data as described in further detail above in relation to FIG. 1. It will be appreciated that other methods of detecting whether an object represented in the image data has been captured in focus or not may be used. It will be appreciated that the analysis of the image data to determine a sharpness characteristic is an optional step, and the sharpness characteristic may be provided based on the characteristics of the focus configuration.

Once the image data has been analysed and it has been determined whether an object within the real-world environment has been captured with a sharpness characteristic exceeding a predetermined threshold, the method progresses to item 130 where a distance of a first object from the camera is determined based. The camera, or another sensor, will have a known focal length and if it is determined that the real-world object represented in the image data is in focus, the object's distance from the camera can also be determined based on the focal length.

Upon calculation of a distance of a first object from the image sensor, an estimate of the relative distance of the second object may be determined based on the difference in the sharpness characteristic. In some examples, this may be achieved using a depth estimator and the sharpness characteristics along with the known focal length of the image sensor. In other examples, a trained neural network may be used in combination with the sharpness characteristic and known focal length of the sensor to calculate the relative distance of the second object in relation to the first object. For example, where the sharpness characteristic indicates that the second object is out of focus (such as being a particular degree of blurriness) the more out of focus the object, the further from the first object the second object is. This relative distance can then be passed to item 340 where a relative depth map is generated. The relative depth map indicates the distance the first object is, from the image sensor and the relative distances of other objects from the first object.

In some examples, the relative depth map may be normalised to produce a depth map indicating estimated actual distances from the image sensor rather than a distance relative to another object.

Figure 4:
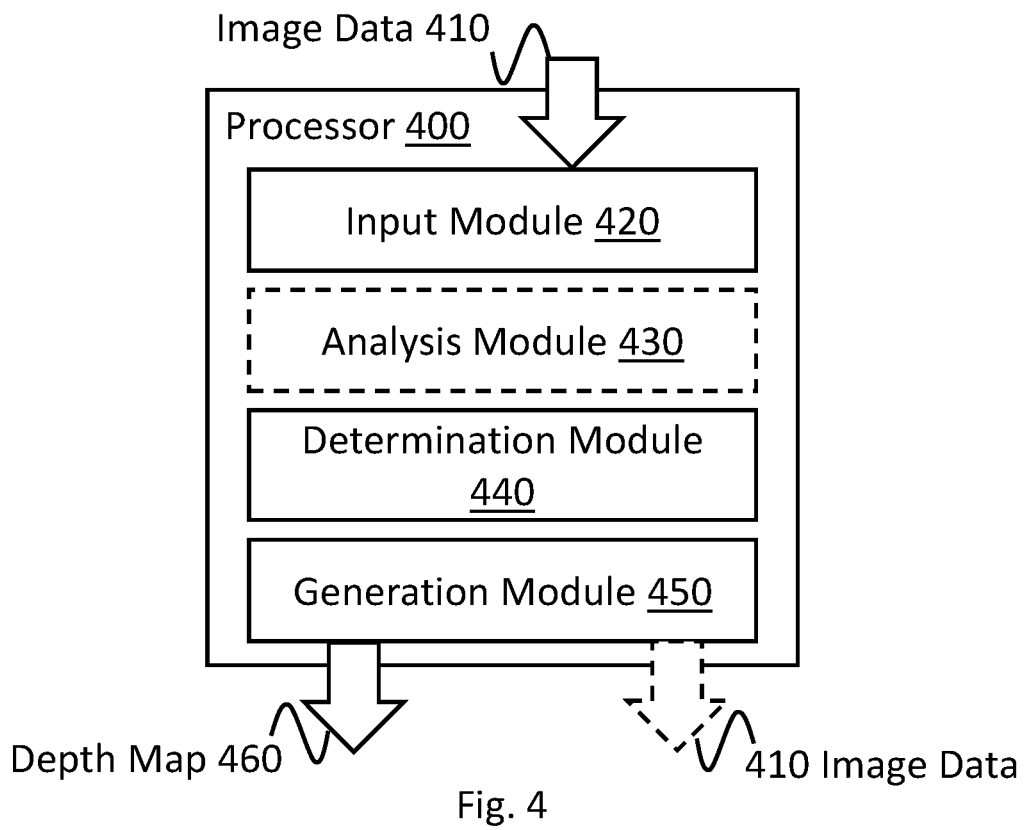
FIG. 4 shows schematically a processor according to an example.

FIG. 4 shows schematically a processor 400 according to an example. The processor 400 may be a specialized processor designed solely for the task of generating depth maps or may form part of a larger processor, such as a graphics processing unit. The processor 400 receives image data 410 from one or more sensors (not shown). The processor 400 comprises an input module 420 arranged to receive the image data 410 from one or more sensors. The one or more sensors may comprise cameras, or other hardware capable of capturing data associated with a real-world environment.

The processor 400 also comprises an optional analysis module 430 for analysing the image data 410 received by the input module 420. The analysis module 430 may be arranged to determine a sharpness characteristic of at least one object in the real-world environment represented by the image data 410. The analysis module 430 may detect one or more objects in the image data 410 which represent real-world objects captured by the sensor, and determine whether said objects have been captured in focus or out of focus. Determining whether the image data 410 represents objects which are in focus or out of focus may be undertaken by applying at least one of a Fast Fourier Transform or a Laplace operator to generate a sharpness characteristic representative of the degree to which an object is in focus in the image data. It will be appreciated that other methods of detecting whether an object represented in the image data has been captured in focus or not may be used. The analysis module 430 is also arranged to determine a sharpness characteristic indicative of whether the object in the image data 410 is in focus or not. In some examples the sharpness characteristic may be provided to the processor and generated based on the focus configuration.

The sharpness characteristic may be a numerical value where 'one' represents an in-focus representation of the real-world object and 'zero' represents an out of focus representation of the real-world object. A threshold value may be set by a user of a system arranged to execute the method indicating the desired level of sharpness required. The threshold value set by the user will indicate the level of error acceptable for determining whether a real-world object is in focus in the image data. As such, the threshold value also determines the accuracy of the depth map generated at item 140. For example, where the threshold is set to 0.75, the method will determine that any objects represented with a sharpness characteristic of 0.75 or higher will be in focus, and as such an estimate of the distance to the object from the sensor will be determined based on the focal length as will be discussed with reference to item 130 below. Where the threshold is set to 0.95, the method will determine that any objects represented with a sharpness characteristic of 0.95 or higher will be in focus, and as such the number of objects determined to be in focus will be lower, thereby increasing the accuracy of the depth map generated. It will be appreciated that the predetermined threshold may be set to any level depending on the requirements of a user.

Once the image data 420 has been analysed and it has been determined whether an object within the real-world environment has been captured with a sharpness characteristic exceeding a predetermined threshold, a determination module 440 determines the distance of the object from the camera. The camera, or other sensors, will have a known focal length and if it is determined that the real-world object represented in the image data is in focus, the object's distance from the camera can also be determined based on the focal length. As such, as mentioned above, the predetermined threshold determines the accuracy of this determination. The lower the threshold the larger the number of objects will be determined to be in focus, and as such they lower the accuracy of any depth map generated.

Once the distance of the real-world object from the camera or other sensor has been determined a depth map 460 may be generated by the generation module 450 based on this distance.

Once the depth map 460 has been generated it may be output to memory (not shown) or to a further processor (not shown) for use in generating content for display on a display device (not shown). In some examples, such as where the image data 410 may also be output, for display on the display device.

In some examples, the processor 400 may be arranged, at the analysis module to detect multiple objects within the image data 410 and determine a sharpness characteristic for each object. In such an example, the processor 400 may also comprise a relative depth map generation module (not shown) which is arranged to generate a relative depth map based on estimating the distance of another object in the real-world environment based on the distance determined for the first object. For example, this may be achieved by comparing the sharpness characteristics of the first and second objects, and/or by capturing multiple representations at different focal lengths. This may be achieved by using a camera having a variable focal length, such as an autofocus mechanism, or having multiple cameras with different fixed focal lengths.

Furthermore, where the processor 400 is arranged to generate a depth map indicating the distances of multiple objects from the sensor, the processor 400 may comprise a normalisation module (not shown) for normalising the relative depth map generated, enabling the distance of multiple objects from the camera to be determined, rather than the relative distances between objects.

Figure 5:
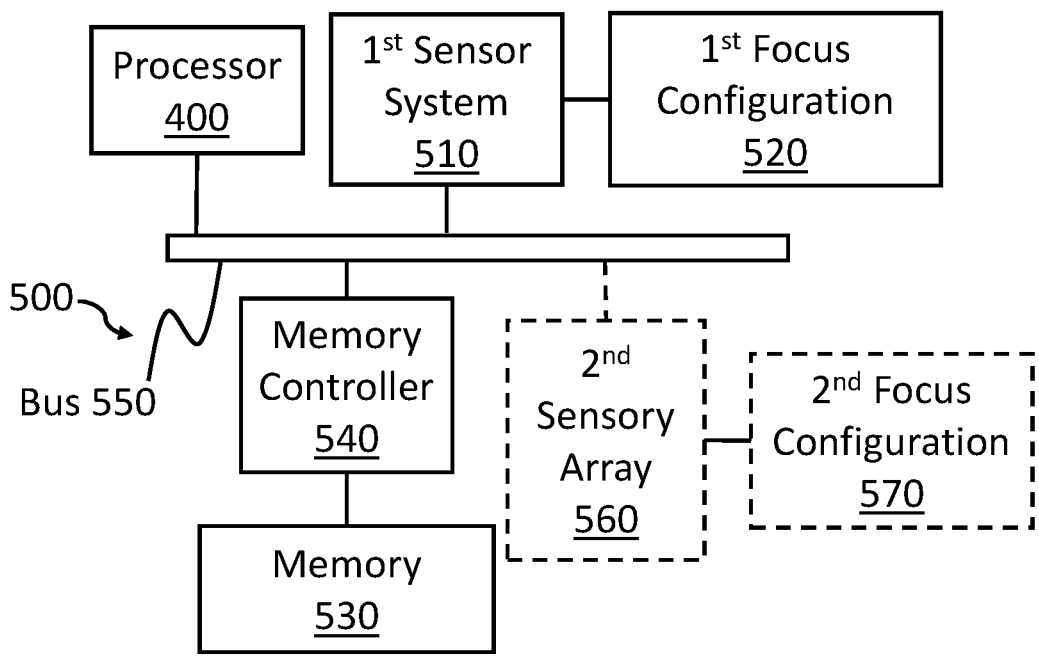
FIG. 5 shows schematically a system according to an example.

FIG. 5 shows schematically a system 500 according to an example. The system 500 comprises a processor 400, as described above in relation to FIG. 4, and also comprises a sensor, or sensor system 510 which comprises at least one focus configuration 520 for directing light to the sensor 510. The processor 400 may be a general-purpose processor such as a central processing unit (CPU), a graphics processing unit (GPU), an image signal processor (ISP), or a neural processing unit (NPU), however in some examples, the processor 400 may be a bespoke processor dedicated to the task of generating depth maps. The sensor or sensor system 510 may be any combination of sensor capable of obtaining information about a real-world environment. This includes, but is not limited to image sensors, such as cameras capable of capturing visual data, infrared data, or other radiation capable of being used to detect or generate depth information associated with the real-world environment. In some examples the sensor or sensor system 510 may include other sensors such as sonar, LiDAR sensors, a laser range finder, or any other sensor capable of obtaining time-of-flight information associated with a real-world environment. Depth information may also be provided by any of a mono-depth convolutional neural network, stereo-imaging triangulation and structured light. In yet further examples, the sensor or sensor system 510 may be a remote device communicably coupled to the system 500 via a network (not shown). In such an example the sharpness characteristic may be provided as metadata from the remote device to the system 500.

The system 500 also comprises memory 530 for storing at least the depth map, and in some embodiments algorithms and methods for generating the depth information and/or sharpness characteristic. The memory is accessed via a memory controller 540. The memory 530 may also be arranged to store other information for use by the system 500 for use by the processor 400. For example, the memory 530 may be arranged to store depth map relating to previous frames of image data, such that the processor 400 can read that information and use it in combination with the image data captured by the sensor 510 to refine and/or update the depth map for a second frame.

The memory controller 540 may comprise a dynamic memory controller (DMC). The memory controller 540 is coupled to the memory 530. The memory controller 540 is configured to manage the flow of data going to and from the memory 530. The memory 530 may comprise a main memory, otherwise referred to as a 'primary memory'. The memory 530 may be an external memory, in that the memory 530 is external to the system 500. For example, the memory 530 may comprise 'off-chip' memory. The memory 530 may have a greater storage capacity than the memory cache(s) of the processor 400. In some examples, the memory 530 is comprised in the system 500. For example, the memory 530 may comprise 'on-chip' memory. The memory 530 may, for example, comprise a magnetic or optical disk and disk drive or a solid-state drive (SSD). In some examples, the memory 530 comprises a synchronous dynamic random-access memory (SDRAM). For example, the memory 530 may comprise a double data rate synchronous dynamic random-access memory (DDR-SDRAM). The memory 530 may be arranged to store depth information as an output from the processor 400.

One or more of the processor 400, and the memory controller 540, the sensor system 510, and the one or more other sensors (not shown) may be interconnected, for example using system bus 550, although it will be appreciated that the processor 400 and at least one of the other components 510, 530 of the system 500 may be directly connected to one another such that the output of one component is connected directly to the input of another component in a pipeline. This allows data to be transferred between the various components. The system bus 550 may be or include any suitable interface or bus. For example, an ARM® Advanced Microcontroller Bus Architecture (AMBA®) interface, such as the Advanced eXtensible Interface (AXI), may be used.

In some examples, the system 500 may comprise a second sensor or sensor array 560, such as a camera with a different focus configuration 570. This enables the system 500 to capture multiple representations of the real-world environment for processing by the processor 400, thereby enabling a more accurate depth map to be generated.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method comprising the steps of:
    obtaining at least a first frame and a second frame of image data, wherein the first frame of image data is captured at a first image sensor having a first focus configuration with a first focal length characteristic, and the second frame of image data is captured at a second image sensor having a second focus configuration with a second, different, focal length characteristic, the first frame of image data and second frame of image data being captured at a given time;
    determining a first distance of a first object in the first frame of image data captured at the given time, based on the first focus configuration and a sharpness characteristic of the first object wherein the sharpness characteristic of the first object exceeds a predetermined threshold;
    determining a second distance of a second, different, object in the second frame of image data captured at the given time, based on the second focus configuration and a sharpness characteristic of the second, different, object, wherein the sharpness characteristic of the second different, object exceeds the predetermined threshold;
    estimating a distance of one or more further objects in the first frame of image data and the second frame of image data captured at the given time, based on a difference between the sharpness characteristic of the first object in the first frame of image data captured at the given time, the sharpness characteristic of the second, different, object in the second frame of image data captured at the given time, and a sharpness characteristic of each of the further objects in the first frame of image data captured at the given time, and the second frame of image data captured at the given time;
    generating normalized depth information associated with the first distance of the first object, the second distance of the second, different, object, and the estimated distance of the one or more further objects; and
    generating a depth map based on the normalized depth information associated with the first distance of the first object, the second distance of the second, different, object, and the estimated distance of the one or more further objects,
    wherein at least one of the first image sensor, or second image sensor comprises an autofocusing focus configuration, and the autofocussing focus configuration is used to determine an area of focus within a given frame of image data, and for identifying the first object or the second, different, object within the scene, based on the area of focus.

2. The method of claim 1, wherein the depth information is obtained from at least one of a mono-depth convolutional neural network, a time-of-flight sensor, stereo-imaging triangulation, and structured light.

3. The method of claim 1, further comprising determining the sharpness characteristic of at least one of the first object in the first frame of image data, or the second, different, object in the second frame of image data, the determining comprising applying at least one of a Fast Fourier Transform, and a Laplace operator to the image data, or determining a point of highest contrast in the first frame of image data or the second frame of image data.

4. The method of claim 1, wherein determining the determined distance comprises combining at least the sharpness characteristic with a depth estimator.

5. A processor comprising:
    an input module for obtaining at least a first frame and a second frame of image data, wherein the first frame of image data is captured at a first image sensor having a first focus configuration with a first focal length characteristic, and the second frame of image data is captured at a second image sensor having a second focus configuration with a second, different, focal length characteristic, the first frame of image data and second frame of image data being captured at a given time;
    a determination module for determining:
        a first distance of first object in the first frame of image data captured at the given time, based on the first focus configuration and a sharpness characteristic of the first object in the first frame; and
        a second distance of a second, different, object in the second frame of image data captured at the given time, based on the second focus configuration and a sharpness characteristic of the second, different, object in the second frame;
    an analysis module for analysing the first frame of image data captured at the given time and the second frame of image data captured at the given time to determine whether the sharpness characteristic of the first object in the first frame and the sharpness characteristic of the second, different, object in the second frame exceed a predetermined threshold;
    an estimation module for estimating a distance of one or more further objects in the first frame of image data and second frame of image data captured at the given time, based on a difference between the sharpness characteristic of the first object in the first frame of image data captured at the given time, the sharpness characteristic of the second, different, object in the second frame of image data captured at the given time, and a sharpness characteristic of each of the further objects in the first frame of image data captured at the given time, and the second frame of image data captured at the given time;

a normalization module for normalizing depth information associated with the first distance of the at least one object, the second distance of the second, different, object, and the estimated distance of the one or more further objects; and a generation module for generating a depth map based on the normalized depth information associated with the first distance of the first object, the second distance of the second, different, object, and the estimated distance of the one or more further objects, wherein at least one of the first image sensor, or second image sensor comprises an autofocusing focus configuration, and the autofocussing focus configuration is used to determine an area of focus within a given frame of image data, and for identifying the first or the second, different, object within the scene, based on the area of focus.

6. A system comprising:

at least a first image sensor having a first focus configuration with a first focal length characteristic, for directing light to the first image sensor, the first image sensor being configured for obtaining a first frame of image data captured at a given time, and a second image sensor having a second focus configuration with a second, different, focal length characteristic for directing light to the second image sensor, the second image sensor being configured for obtaining a second frame of image data captured at the given time; and a processor arranged to receive the first frame of image data captured at the given time obtained by the first image sensor and the second frame of image data captured at the given time obtained by the second image sensor, the processor comprising:

an input module for obtaining the first frame of image data and second frame of image data, the first frame of image data and second frame of image data being captured, at the given time;

a determination module for determining:

a first distance of a first object in the first frame of image data captured at the given time, based on the first focus configuration and a sharpness characteristic of the first object in the first frame; and a second distance of the second, different, object in the second frame of image data captured at the given time, based on the second focus configuration and a sharpness characteristic of the second, different, object in the second frame;

an analysis module for analysing the first frame of image data captured at the given time and the second frame of image data captured at the given time to determine whether the sharpness characteristic of the first object in the first frame and the sharpness characteristic of the second, different, object in the second frame object exceed a predetermined threshold;

an estimation module for estimating a distance of one or more further objects in the first frame of image data and second frame of image data captured at the given time, based on a difference between the sharpness characteristic of the first object in the first frame of image data captured at the given time, the sharpness characteristic of the second, different, object in the second frame of image data captured at the give time, and a sharpness characteristic of each of the further objects in the first frame of image data captured at the given time, and the second frame of image data captured at the give time;

a normalization module for normalizing depth information associated with the first distance of the at least one object, the second distance of the second, different, object, and the estimated distance of the one or more further objects; and a generation module for generating a depth map based on the normalized depth information associated with the first distance of the first object, the second distance of the second, different, object and the estimated distance of the one or more further objects, wherein at least one of the first image sensor, or second image sensor comprises an autofocusing focus configuration, and the autofocussing focus configuration is used to determine an area of focus within a given frame of image data, and for identifying the first or the second, different, object within the scene, based on the area of focus.

7. The system of claim 6, wherein the at least one focus configuration further comprises any of:

an aperture characteristic; and a lens property.

8. The system of claim 6, wherein the processor is at least one of a central processing unit; an image signal processor, a graphics processing unit, or a neural processing unit.

* * * * *